United States Patent

Crighton et al.

[11] Patent Number: 5,972,490
[45] Date of Patent: Oct. 26, 1999

[54] POLYMERIC FILMS

[75] Inventors: Allan J Crighton, Swindon; Helen A Biddiscombe, North Petherton, both of United Kingdom

[73] Assignee: Hoechst Trespaphan GmbH, Germany

[21] Appl. No.: 08/945,172

[22] PCT Filed: Apr. 24, 1996

[86] PCT No.: PCT/GB96/00972

§ 371 Date: Oct. 24, 1997

§ 102(e) Date: Oct. 24, 1997

[87] PCT Pub. No.: WO96/34742

PCT Pub. Date: Nov. 7, 1996

[30] Foreign Application Priority Data

Apr. 29, 1995 [GB] United Kingdom ................. 9508766

[51] Int. Cl.$^6$ ................ B32B 27/00; B32B 7/12

[52] U.S. Cl. ................ 428/315.5; 428/315.9; 428/317.3; 428/317.7; 428/317.9; 428/349; 428/515; 428/517

[58] Field of Search ............... 428/315.5, 315.7, 428/315.9, 316.6, 317.1, 317.3, 317.7, 317.9, 318.4, 318.6, 349, 515, 517

[56] References Cited

U.S. PATENT DOCUMENTS

| | | | |
|---|---|---|---|
| 4,303,708 | 12/1981 | Gebhardt et al. | 428/35 |
| 4,698,261 | 10/1987 | Bothe et al. | 428/349 X |
| 4,780,364 | 10/1988 | Wade et al. | 428/317.9 X |
| 5,028,480 | 7/1991 | Dean | 428/317.9 X |
| 5,091,236 | 2/1992 | Keller et al. | 428/213 |
| 5,178,942 | 1/1993 | Frognet et al. | 428/317.9 |
| 5,277,970 | 1/1994 | Schuhmann et al. | 428/323 |
| 5,318,834 | 6/1994 | Foulkes et al. | 428/349 X |
| 5,326,625 | 7/1994 | Schuhmann et al. | 428/215 |
| 5,498,473 | 3/1996 | Williamson | 428/317.3 |
| 5,514,460 | 5/1996 | Surman et al. | 428/315.7 X |
| 5,527,601 | 6/1996 | Crighton et al. | 428/316.6 |
| 5,573,717 | 11/1996 | Peiffer et al. | 428/315.5 X |

FOREIGN PATENT DOCUMENTS

| | | | |
|---|---|---|---|
| 49-012 815 | 2/1974 | Japan . | |
| 61-228 053 | 10/1986 | Japan | B29C 55/12 |
| 2 195 947 | 4/1988 | United Kingdom | B29D 9/00 |

Primary Examiner—Daniel Zirker
Attorney, Agent, or Firm—Bacon & Thomas, PLLC

[57] ABSTRACT

Biaxially oriented polyolefin films comprising a core layer of propylene polymer, an intermediate layer of a non-voided, substantially non-pigmented propylene polymer on the core layer, and an outer skin layer of a polyolefin including titanium dioxide as a pigment are disclosed. Such films have good gloss.

10 Claims, No Drawings

POLYMERIC FILMS

BACKGROUND OF THE INVENTION

1. Field of the Invention

This invention concerns polymeric films and more particularly polypropylene films having good gloss.

2. Description of Related Art

It has been proposed hitherto in EP0004633-A to produce opaque polypropylene films, the opacity resulting from microvoids within a core layer of a three layer film structure. The outer heat sealable layers of these films impart a degree of gloss to the films. However, higher degrees of opacity combined with high gloss values have been sought in the art.

One proposal for increasing the opacity of polypropylene films has been to use titanium dioxide as a filler. GB2195947-A, for example, describes biaxially oriented polypropylene films having a base layer of a voided propylene homopolymer with an outer heat sealable polymeric layer containing titanium dioxide thereon. The titanium dioxide in the outer layer imparts improved opacity to the films compared with analogous voided films such as are described in EP 0004633-A, but the surface gloss of the films is reduced.

It has been proposed in EP 0517109-A to use a layer of a propylene homopolymer containing finely divided titanium dioxide between a propylene homopolymer core layer and a polymeric outer layer containing no filler, and such films are said to have high gloss.

SUMMARY OF THE INVENTION

According to the present invention there are provided biaxially oriented polyolefin films comprising a core layer of a propylene polymer, an intermediate layer of a non-voided, substantially non-pigmented propylene polymer on the core layer, and an outer skin layer of a polyolefin including titanium dioxide as a pigment.

It has surprisingly been found that by including titanium dioxide in the outer skin layer, films with particularly high gloss can be achieved compared, for example, with films having titanium dioxide in the intermediate layer and no titanium dioxide in the outer skin layer. This is also particularly surprising since films analogous to films of the present invention but without the intermediate layer between the core layer and a titanium dioxide containing skin layer show low gloss. The low gloss of these latter films is not surprising since the use of titanium dioxide in the outer surface of polyolefin films has been proposed hitherto for making synthetic papers with writable surfaces, for example J49012815 and J61228053.

The core layer of films of the present invention is of a propylene polymer, and it is preferably of a propylene homopolymer or a copolymer of propylene with low amounts, e.g. up to 2 wt %, of ethylene. The core layer can be voided or non-voided, and known organic or inorganic voiding agents can be used to effect voiding using known methods, for example using polymeric particles e.g. polyesters such as polyethylene terephthalate or polybutylene terephthalate, or polyamides such as nylons, or inorganic particulates such as chalk. The voiding agent should be of a size such that it can initiate voids when the films of the present invention are biaxially oriented.

In addition to or alternatively to a voiding agent, the core layers of films of the present invention can include one or more pigments, a particularly preferred pigment being titanium dioxide.

The core layer will usually include one or more additives which impart antistatic and slip properties to the films, examples of materials for imparting such properties being known in the art.

The intermediate layer is of a non-voided, substantially non-pigmented propylene polymer. The preferred propylene polymers are propylene homopolymers or copolymers of propylene with low amounts, e.g. up to 2 wt %, of ethylene. It is also preferred that the propylene polymers have an isotactic content of at least 90%.

The outer skin layer is of a polyolefin, and preferably a propylene polymer. However, it is generally preferred that the outer skin layer should be heat sealable, for example to itself, and it is therefore preferred to use copolymers derived from two or more a-olefins including ethylene. For example, the polyolefin of the outer layer can be a copolymer containing units derived from propylene and one or more of ethylene, butene-1 and a-olefins containing from 5 to 10 carbon atoms. The outer layer can also be formed from blends of polyolefins. However, when blends are used, it is generally preferred that the components of the blend are compatible so that they do not reduce the surface gloss of the outer layer.

The amount of titanium dioxide in the outer skin layer will usually be at least 2.5 wt % of the skin layer in order to pigment the films. However, it is generally preferred that the skin layer should not contain more than 25 wt % of titanium dioxide based on the weight of the skin layer as very high levels of titanium dioxide can reduce the surface gloss of the films and it can reduce the mechanical strength of the outer skin layer, for example it can reduce the seal strength of heat seals formed by the films. Films in accordance with the present invention can be made in a variety of thicknesses. However, it is generally preferred that the outer skin layer containing titanium dioxide is in the range of from 0.5 to 8.0 $\mu$m thick, and more preferably from 1.0 to 3.0 $\mu$m thick. The intermediate layer of non-voided, non-pigmented propylene polymer will usually be thicker than the outer skin layer, preferred thicknesses being from 2 to 15 $\mu$m, with thicknesses of from 3 to 8 $\mu$m being particularly preferred.

The titanium dioxide pigment used in the outer layer of films in accordance with the present invention should be of a particle size which does not initiate voiding of the polymer in which it is present, the mean particle size preferably being less than 1 $\mu$m. Particles of titanium dioxide of this size are usually insufficient to cause voiding of propylene homopolymers.

The core layer and any other layers present can then be of a thickness which provides a film with the desired thickness, for example in the range of from 25 to 80 $\mu$m.

DETAILED DESCRIPTION OF THE PREFERRED EMBODIMENT

Although films in accordance with the present invention have the three specified layers, it is generally preferred that they include at least one further layer on the surface of the core layer remote from the specified intermediate and outer skin layers. Such further layer or layers are preferably of one or more polyolefins, the outer surface formed by such further layer or layers preferably being of a heat sealable polyolefin. Thus films in accordance with the present invention preferably consist of four or five layers, the further layer or layers being selected to provide the films with properties required for that side of the films. A particularly preferred film structure consists of five layers, a central core layer with two intermediate layers of non-voided, unpigmented propylene polymer(s) and two outer skin layers of propylene polymer, at least one containing titanium dioxide. The polymers used for the two intermediate layers and for the two outer skin layers can then be the same or different on each side of the core layer, and the amount of titanium dioxide in the two outer skin layers can also be the same or different.

In general, in addition to the titanium dioxide present in the outer skin layer or layers, films in accordance with the present invention will usually include an antiblock agent in both of their outer surfaces. Suitable antiblock agents are known in the art, for example silica.

Films in accordance with the present invention can be produced by known methods, for example by coextrusion of the respective layers followed by simultaneous or sequential biaxial stretching. Where voiding agents, pigments, for example the titanium dioxide used in the outer layer(s), or other additives, such as antistatic or slip additives, are incorporated into one or more layers of the films, they are preferably introduced in the form of one or more masterbatches.

It is particularly preferred to form films of the present invention by coextruding through a slot die melts of the polymers for the respective layers, preferably using masterbatches to introduce additives for the respective layers, and then to effect sequential stretching of the coextrudate. Stretching in the direction of extrusion is preferably effected by from 4:1 to 7:1 by passing the coextrudate over heated rollers rotating at different peripheral speeds, and then in the transverse direction, for example by from 5:1 to 10:1 using a stenter oven. The biaxially stretched film is then preferably annealed with some dimensional shrinkage, and the outer skin layer containing titanium dioxide is then preferably treated to increase its surface energy, for example by flame or corona discharge treatment, before being wound up.

The following Examples are given by way of illustration only. In all cases, gloss measurements are recorded for the surface of the films containing titanium dioxide or the surface having an intermediate layer containing titanium dioxide beneath the outer layer for which the measurement is made.

EXAMPLE 1

A four layer polymer web was coextruded through a slot die using melts of the respective polymers, the web consisting of a first outer layer of a propylene/ethylene copolymer (4 wt % ethylene) containing 15 wt % of titanium dioxide of mean particle size <1 μm, and 0.1 wt % of silica having a mean particle size of approximately 3.5 μm, an intermediate layer of a propylene homopolymer. A core layer of the same propylene homopolymer as the intermediate layer, but containing 10.6 wt % of chalk with a mean particle size of 3 μm, and a second outer layer of the propylene/ethylene copolymer as the first outer layer and containing the same amount of the same silica but without any titanium dioxide.

The coextruded web was cooled to solidify the melts by passing it over a chill roll, and it was then stretched 4.5 times in the direction of extrusion by passing it over rollers heated at 110° C., the rollers rotating at different peripheral speeds. Thereafter, the monoaxially stretched web was stretched 10 times in the transverse direction using a stenter oven at 163° C., and the resulting biaxially stretched film was annealed. The cooled film was then subjected to corona discharge treatment on both outer faces, and the film was wound up.

The resulting film had a total thickness of 82 μm, the two outer skin layers being 2.5 μm thick and the single intermediate layer 8 μm thick. The remainder of the film was a core layer of voided propylene homopolymer. The film had a density of 0.62 g/cm$^3$. The skin layer adhered well to the intermediate layer as assessed by an adhesive tape test.

The RB3 gloss of the film was measured at 20° using a Dr Lange reflectometer, and the value obtained being given in Table I. Table I also shows the optical density of the film.

EXAMPLE 2 (Comparison)

A three layer polymer film was produced using the method of Example 1 but with the omission of the intermediate layer. The thickness of the final film was 80 μm, the two outer layers each being 2.5 μm thick.

The RB3 gloss of the film was measured at 20° using the method used in Example 1, the value obtained being given in Table I with the optical density of the film and the adhesion of the outer layer to the core layer. The density of the film was 0.62 g/cm$^3$. The skin layer did not adhere well to the core layer as assessed by an adhesive tape test.

EXAMPLE 3 (Comparison)

A four layer film was produced using the method described in Example 1 but with the titanium dioxide from the first outer layer being included in the intermediate layer in an amount of 14 wt % of the intermediate layer instead of in the first outer layer. The density of the film was 0.62 g/cm$^3$.

The RB3 gloss of the film was measured at 20° using the method used in Example 1, the value obtained being given in Table I with the optical density of the film.

TABLE 1

| Example | Film Thickness(μm) | Gloss (RB3, 20°) | Optical Density |
|---|---|---|---|
| 1 | 82 | 40 | 0.82 |
| 2 (Comparison) | 80 | 5 | 0.76 |
| 3 (Comparison) | 80 | 31 | 0.75 |

The gloss was measured at 20° since this gives values more representative of gloss as assessed by the eye. The film of the present invention showed high gloss combined with a resistance to removal of the white titanium dioxide containing layer in the adhesive tape test. The film of the present invention also had a higher optical density than that of the comparison Examples.

EXAMPLES 4–8

Five four layer films, each being 40 μm thick, were produced by the method described in Example 1, the respective thicknesses of the various layers of the resultant films being given in Table 2. However, the core layers of these films contained 3.5wt % of chalk having a mean particle size of 1 μm. The density of each of the films was 0.75 g/cm$^3$.

EXAMPLE 9 (Comparison)

A four layer film was produced in a similar manner to that described in Example 3, but using 3.5 wt % of chalk having a mean particle size of 1 μm and having the titanium dioxide in the intermediate layer rather than in the outer layer. The film had a density of 0.75 g/cm$^3$.

TABLE 2

| Example | Outer layer Thickness(μm) | Inter layer Thickness(μm) | Gloss (RB3, 20°) | Optical Density |
|---|---|---|---|---|
| 4 | 1 | 3 | 36 | 0.69 |
| 5 | 1 | 5 | 53 | 0.64 |
| 6 | 2.5 | 3 | 39 | 0.73 |
| 7 | 2.5 | 8 | 49 | 0.61 |
| 8 | 2.5 | 5 | 52.5 | 0.63 |
| 9 (Comparison) | 1 | 3 | 30 | 0.62 |

EXAMPLE 10 (Comparison)

A three layer polymer web was produced by coextruding a core layer of polypropylene homopolymer containing 11.5 wt % of titanium dioxide having a mean particle size of <1 μm with two outer layers of a propylene/ethylene copolymer (5 mol % ethylene) on each surface of the core layer. Thereafter, the web was biaxially stretched as described in Example 1.

The resultant biaxially stretched film had a total thickness of 35 μm, with each outer layer being 0.8 μm thick.

The Dr Lange 20° gloss and optical density of this film are given in Table 3.

EXAMPLE 11

A four layer film was produced substantially as described in Example 1, except that the core layer contained 11.5 wt % of titanium dioxide having a mean particle size of <1 μm and no chalk.

After biaxially stretching the four layer web, the film had a total thickness of 35 μm, with each outer layer being 1 μm thick. The intermediate layer had a thickness of 5 μm, and the outer layer thereon contained 15 wt % of titanium dioxide.

The 20° Dr Lange gloss of the film and its optical density are given in Table 3.

TABLE 3

| Example | Film Thickness(μm) | Gloss (RB3, 20°) | Optical Density |
|---|---|---|---|
| 10 (Comparison) | 35 | 45 | 0.58 |
| 11 | 35 | 66 | 0.65 |

We claim:

1. Biaxially oriented polyolefin film exhibiting good gloss comprising a core layer of polypropylene, an intermediate layer of a non-voided, substantially non-pigmented polypropylene on the core layer, and an outer skin layer of a polyolefin including titanium dioxide as a pigment.

2. Film according to claim 1, wherein the core layer comprises a polypropylene homopolymer.

3. Film according to claim 1, wherein the core layer is voided.

4. Film according to claim 1, wherein the core layer includes a non-voiding pigment.

5. Film according to claim 1, wherein the intermediate layer comprises a polypropylene homopolymer.

6. Film according to claim 1, wherein the outer skin layer comprises an olefin polymer.

7. Film according to claim 6, wherein the olefin polymer comprises a copolymer of propylene and at least one other a-olefin.

8. Film according to claim 7, wherein the at least one other a-olefin is selected from ethylene and butene-1.

9. Film according to claim 1, wherein the skin layer contains at least 5 wt % of titanium dioxide.

10. Film according to claim 1, wherein the skin layer contains up to 25 wt % of titanium dioxide.

* * * * *